United States Patent [19]

Shiba et al.

[11] Patent Number: 5,057,960
[45] Date of Patent: Oct. 15, 1991

[54] HUB FOR A DISK TYPE RECORDING MEDIUM

[75] Inventors: Haruo Shiba; Masaru Ikebe; Toshihiko Ishida, all of Komoro, Japan

[73] Assignee: TDK Corporation, Tokyo, Japan

[21] Appl. No.: 609,621

[22] Filed: Nov. 6, 1990

Related U.S. Application Data

[63] Continuation of Ser. No. 279,090, Dec. 2, 1988, Pat. No. 5,010,435.

[30] Foreign Application Priority Data

Dec. 3, 1987 [JP] Japan .............................. 62-184643

[51] Int. Cl.⁵ .......................... G11B 23/03; G11B 3/70
[52] U.S. Cl. ..................................... 360/133; 369/290; 369/270
[58] Field of Search ................ 360/133, 135; 369/270, 369/290

[56] References Cited

U.S. PATENT DOCUMENTS 4,866,697 9/1989 Yamaguchi et al. ................ 360/133

Primary Examiner—A. J. Heinz
Assistant Examiner—Jefferson Evans
Attorney, Agent, or Firm—Oblon, Spivak, McClelland, Maier & Neustadt

[57] ABSTRACT

A hub to be attached to the central portion of a recording medium comprises a flat plate-like body made of a metallic material, and an annular resinous body firmly attached to the flat plate-like body by insert-molding, wherein at least one bent portion with an opening for connecting the annular resinous body to the flat-plate-like body is formed in the flat plate-like body so that the opening is in parallel to the upper or lower surface of the flat plate-like body.

6 Claims, 9 Drawing Sheets

HUB FOR A DISK TYPE RECORDING MEDIUM

This is a continuation of application Ser. No. 07/279,090, filed on Dec. 2, 1988, now U.S. Pat. No. 5,010,435.

BACKGROUND OF THE INVENTION

1. Field of the Invention

The present invention relates to a hub for a disk type recording medium such as an optical disk, an optical-magnetic disk, a floppy disk, a cleaning disk or the like.

2. Discussion of Background

There have been known optical disks, optical-magnetic disks, floppy disks and other disks as disk type recording media for recording information such as sounds, voices, pictures and data. There have also been known disks for cleaning a head for a driving unit on which a floppy disk is mounted. Some types of the disk type recording medium are provided with a hub at its center. There are two types of hub for a disk type recording medium, i.e. one being formed by drawing a single metallic circular plate to form a flange portion at its outer periphery and the other being formed by a metallic portion and a resinous portion in one-piece body. The later is more advantageous than the former because it has good machining accuracy, it is manufactured at a low cost and processability to attach a hub to the disk is high.

For instance, a hub to be attached to an optical disk cartridge has a construction as shown in FIG. 16, (a plane view) and FIG. 17 (a cross-sectional view taken along a line A—A in FIG. 16). In FIGS. 16 and 17, a reference numeral 10 designates a flat circular plate which constitutes a metallic part, and a numeral 12 designates a resinous part. A plurality of openings 14, which are used for fixing the resinous part, are formed vertically near the outer circumferential portion of the metallic part 10. When insertion-molding of a resinous material is carried out, the resinous material is filled in the openings 14 and cured there, whereby the resinous part 10 is firmly attached to the metallic part 10. A reference shaft insertion hole 16 is formed at the center of the metallic part 10, and an annular projection 18 is formed by melt-bonding near the outer periphery of the resinous part 12 so as to be able to attach a disk at the lower face. A bonding means such as an adhesive agent or an adhesive tape may be provided instead of the annular projection 18. The reference shaft insertion hole 16 functions as a standard to determine a position of the disk to a driving unit.

A construction of another conventional hub used for an optical disk cartridge is shown in FIG. 18 (a plane view) and FIG. 19 (a cross-sectional view taken along a line B—B in FIG. 18). In FIGS. 18 and 19, a reference numeral 20 designates a flat circular plate which constitutes a metallic part, and a numeral 22 designates a resinous prat. A plurality of projections 24 are formed at the outer periphery of the metallic part 20 so as to be inclined. When insertion-molding of a resinous material is carried out, the resinous material surrounds around the projections 24, whereby the resinous part 22 is firmly fixed to the metallic part 20. A reference shaft insertion hole 26 is formed at the center of the metallic part 20.

However, the hub illustrated in FIGS. 16 and 17 in which the holes 14 for fixing the resinous part to the metallic part is formed vertically near the outer circumference of the metallic part 10 requires means for preventing the resinous part from coming off. Namely, it is necessary to form a tapered portion or an undercut portion in the inner wall surface of the holes. However, it is difficult to provide such measures around the outer circumference by a stamping operation. Since a strain is apt to take place when a large opening is formed, it is difficult to obtain a sufficient strength at an area having a large hole. Further, the resinous part is apt to separate from the metallic part when the holes are formed near the reference shaft insertion hole.

In the hub illustrated in FIGS. 18 and 19 in which the projections 24 are formed at the outer periphery of the metallic part 20 so as to be inclined from the flat surface of the metallic part 20, the outer configuration is inevitably large because of the presence of the projections 24, whereby manufacturing cost becomes high. Further, since a very thin resinous part has to be formed, there sometimes causes a short shot 30 as shown in FIG. 20 wherein a molten resinous material does not flow in a very thin gap in the mold at the time of the insertion-molding. When such short shot takes place, plainness in the surface of the hub is deteriorated to thereby provide a poor appearance.

SUMMARY OF THE INVENTION

It is an object of the present invention to provide a hub for a disk-type recording medium capable of connecting firmly a resinous part to a metallic part, having accurate dimensions and being manufactured at a low cost.

The foregoing and the other objects have been attained by providing a hub to be attached to the central portion of a recording medium which comprises a flat plate-like body made of a metallic material, and an annular resinous body firmly attached to the flat plate-like body by insert-molding, wherein at least one bent portion with an opening for connecting the annular resinous body to the flat-plate like body is formed in the flat plate-like body so that the opening is in parallel to the upper or lower surface of the flat plate-like body.

BRIEF DESCRIPTION OF THE DRAWINGS

A more complete appreciation of the invention and many of the attendent advantages thereof will be readily obtained as the same becomes better understood by reference to the following detailed description when considered in connection with the accompanying drawings, wherein:

FIG. 1 shows an embodiment of the hub for a disk type recording medium used for the optical disk cartridge according to the present invention wherein

DETAILED DESCRIPTION OF THE PREFERRED EMBODIMENTS

Figure 1A:
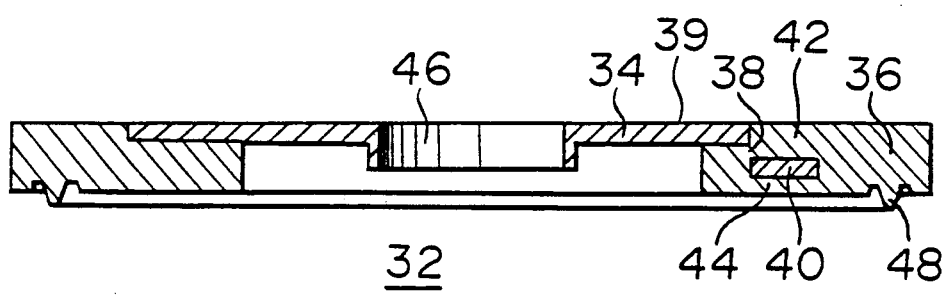
FIG. 1A is an enlarged cross-sectional view taken along a line C—C in FIG. 2
Figure 1B:
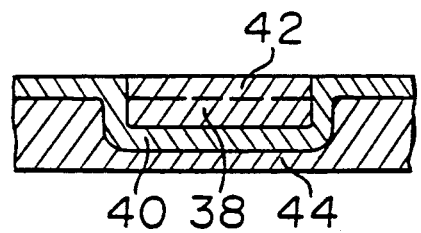
FIG. 1B is an enlarged cross-sectional view taken along a line D—D in FIG. 2.
Figure 2:
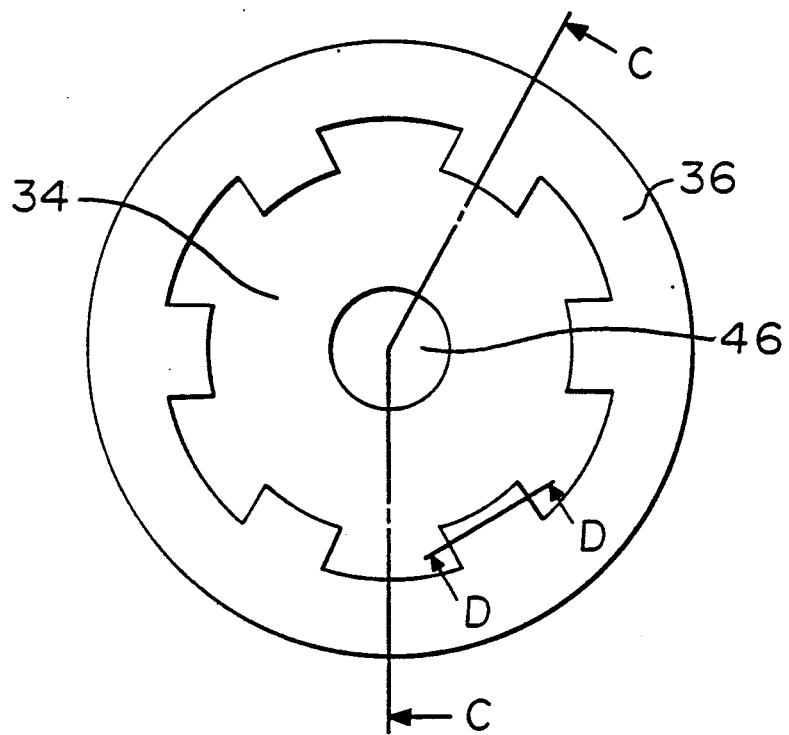
FIG. 2 is a plane view of the hub shown in FIG. 1.
Figure 3:
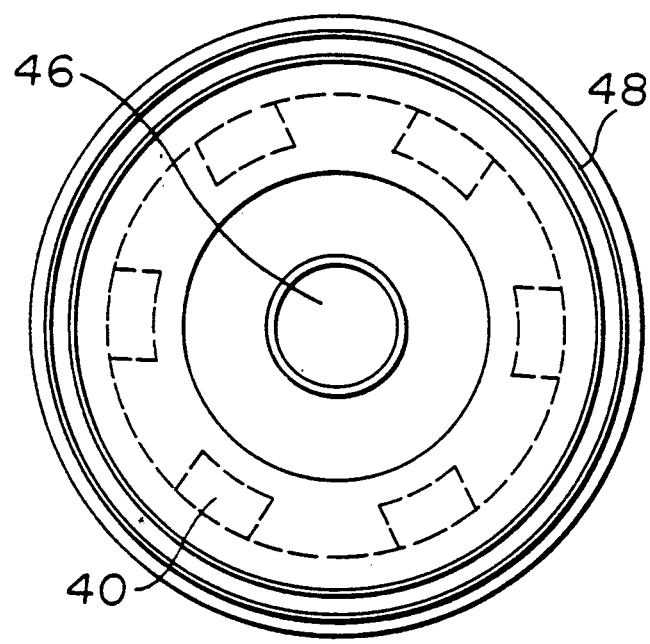
FIG. 3 is a bottom view of the hub shown in FIG. 1.

Referring to the drawings, wherein the same reference numerals designate the same or corresponding parts throughout the several views, and more particularly to FIGS. 1 to 3 thereof, there is shown an embodiment of the hub for a disk type recording medium of the present invention. In the figures, a reference numeral 32 designates a hub for a disk type recording medium which comprises a metallic part 34 and a resinous prat 36 which is formed in one piece by insertion-molding of a resinous material. The metallic part 34 is a flat plate-like body made of stainless steel and is provided with a plurality of holes 38 in positions near its outer periphery so that a resinous part 36 is firmly connected to the metallic part 34 by means of the holes 38 by the insertion-molding. The holes 38 are so formed as to be in parallel to the upper surface 39 as a reference surface of the flat plate-like metallic part after the metallic part has been subjected to a stamping operation or a bending operation. It is preferable that the holes are formed near the outer periphery of the metallic parts 34 as a circular plate-like body at equal angular distances.

Figure 4:
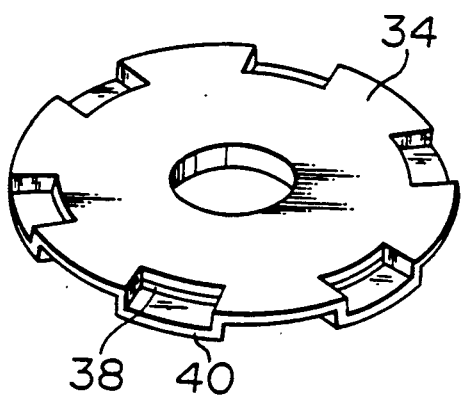
FIG. 4 is a perspective view of the metallic part of the hub.

FIG. 4 shows a metallic part 34 having six holes. The holes may be formed in parallel to the lower surface, as a reference surface, of the metallic part 34. When an insertion-molding of a resinous material is carried out and the material is cured, the resinous material enters in the holes 38 to thereby connect an upper resinous portion 42 to a lower resinous portion 44, whereby the resinous part 36 is firmly attached to the metallic part 34. Further, the holes 38 are formed in the metallic part 34 by a shearing force in the bending operation so as to be in parallel to the upper surface 39 or the lower surface of the metallic part. Accordingly, there causes no strain in the metallic part 34 even though large holes 38 are formed, the large hole being effective to firmly connect the resinous part 36 to the metallic part 34.

A reference shaft insertion hole 46 is formed at the center of the metallic part 34. An annular projection 48 to attach a disk is provided by melt-bonding near the outer periphery of the resinous part 36. The projection may be provided by using an adhesive or other means.

Figure 5:
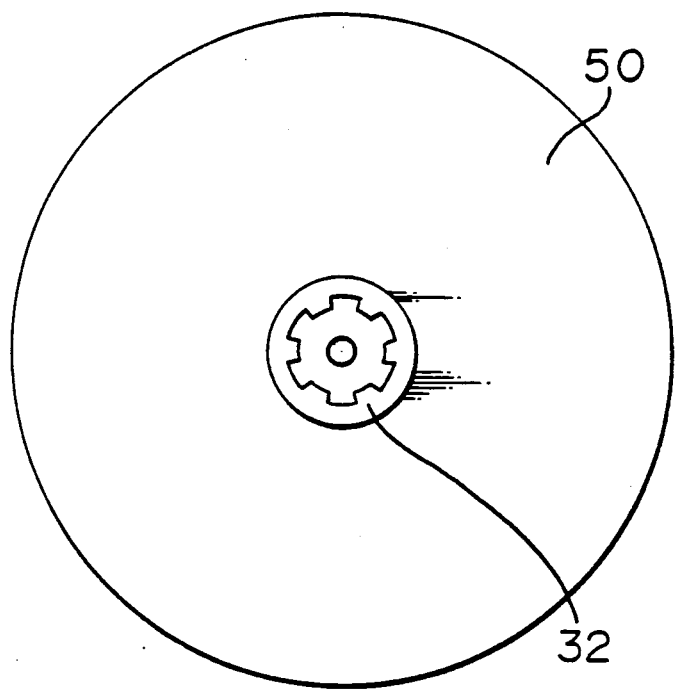
FIG. 5 is a plane view of a disk having at its center the hub of the present invention.
Figure 6:
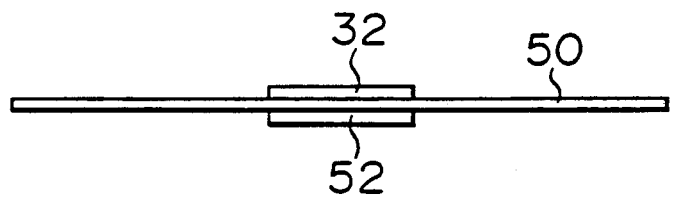
FIG. 6 is a side view of the disk shown in FIG. 5.

FIGS. 5 and 6 show a disk 50 with a hub 32 at the central portion of its one surface by utilizing the annular projection 48. An additional hub 52 is also attached to the other surface of the disk 50. When the hub is attached to the disk by melt-bonding, the same resinous material such as polycarbonate as the disk is used. However, when the hub is attached to the disk by an adhesive agent or a dual surface bonding tape, a different material may be used for bonding them.

Figure 7:
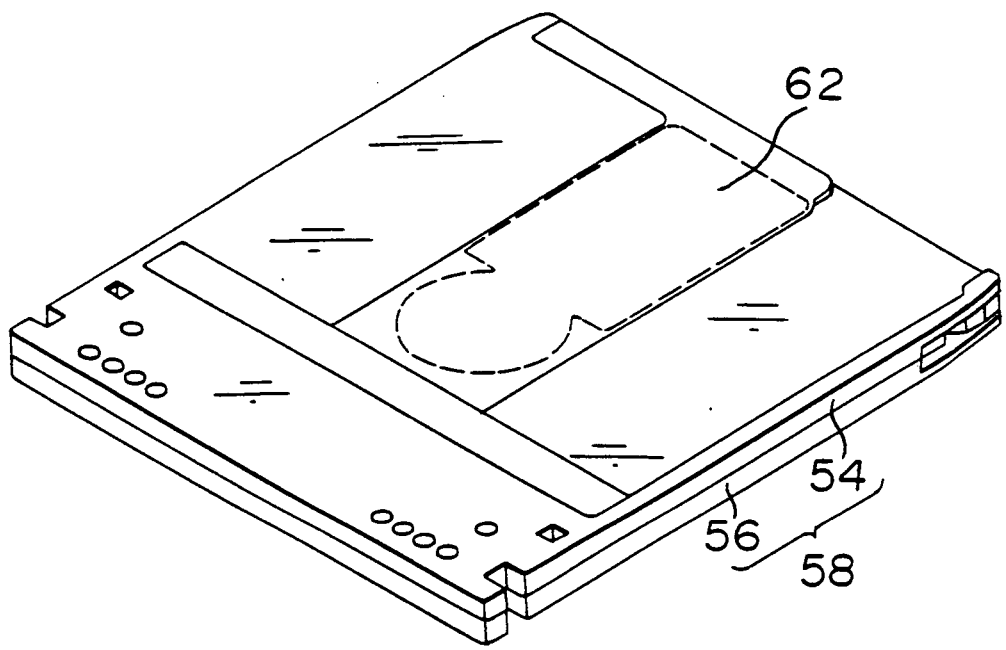
FIG. 7 is a perspective view of a typical optical disk cartridge.
Figure 8:
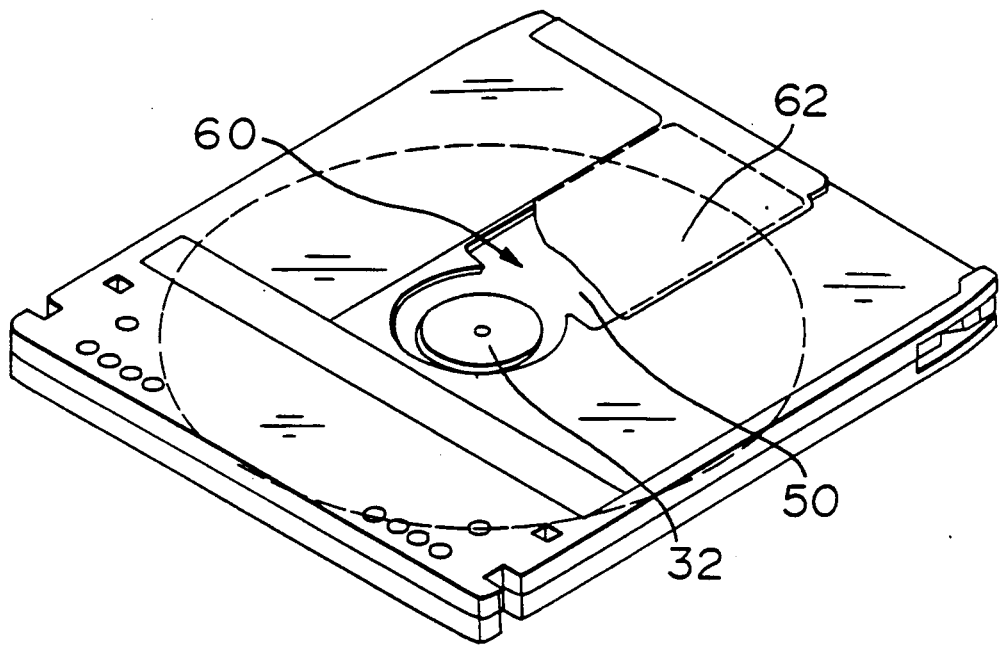
FIG. 8 shows the optical disk cartridge as in FIG. 7 with a part of a shutter mechanism broken.

FIG. 7 shows an optical disk cartridge comprising a casing 58 consisting of the upper and lower half casings 54, 56 in which the disk 50 is received in a specified position. The upper and lower half casings 54, 56 respectively have an opening 60 which allows the insertion of a reference shaft for the engagement with the hub 32 and a head for recording and reproducing information at corresponding positions at the central area of the half casings as shown in FIG. 8. Since the openings 60 are closed by a channel-like shutter means 62 capable of opening and closing when the optical disk cartridge is not used, there is no possibility of entering of dust inside of it to damage the disk 50.

Figure 9:
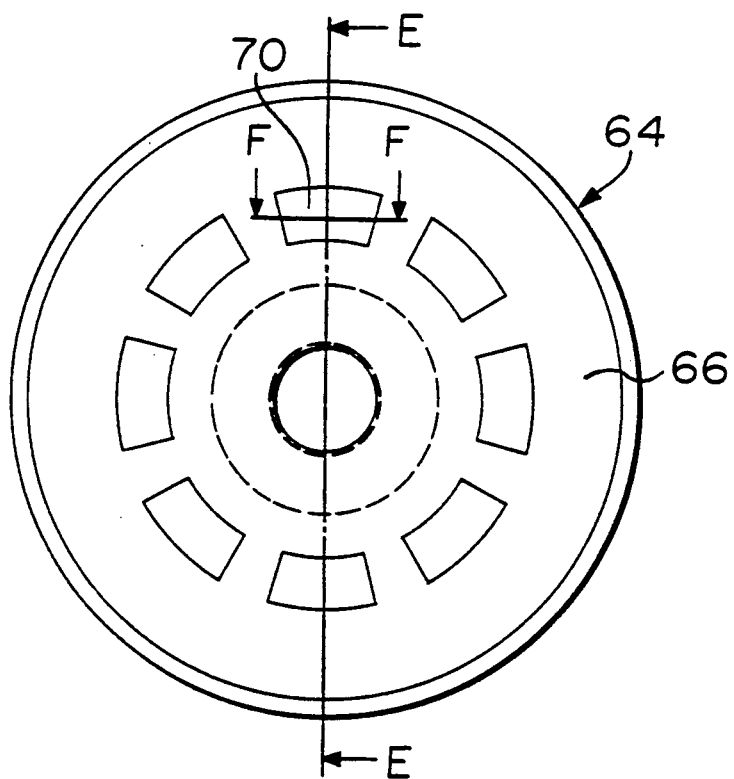
FIG. 9 is a plane view of a second embodiment of the hub according to the present invention which is used for an optical disk cartridge.

FIG. 9 is a plane view showing a second embodiment of the hub according to the present invention, and FIG. 10A and FIG. 10B are respectively enlarged cross-sectional views taken along lines E—E and F—F in FIG. 9. The construction of the second embodiment is substantially the same as that of the first embodiment except that the position of bent portions in the metallic part is different. Accordingly, description of the same or corresponding parts is omitted.

Figure 10:
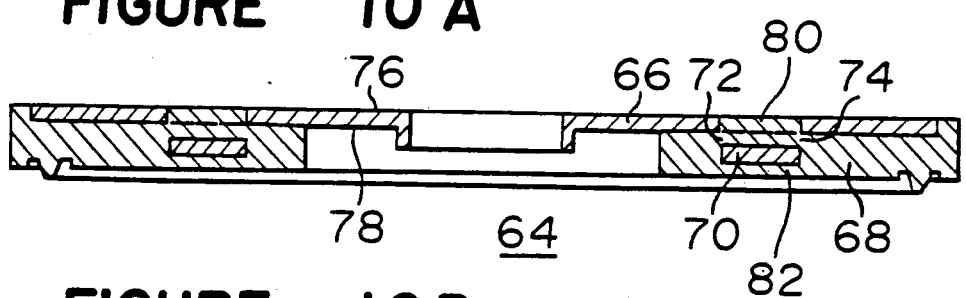
FIG. 10A is an enlarged cross-sectional view taken along a line E—E in FIG. 9.
FIG. 10B is an enlarged cross-sectional view partly broken taken along a line F—F in FIG. 9.
Figure 10:
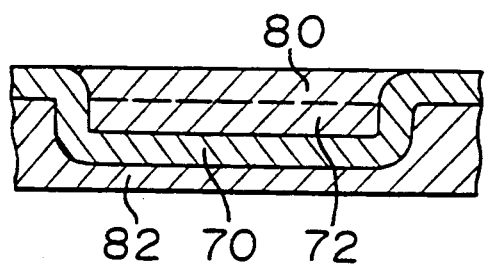
Figure 11:
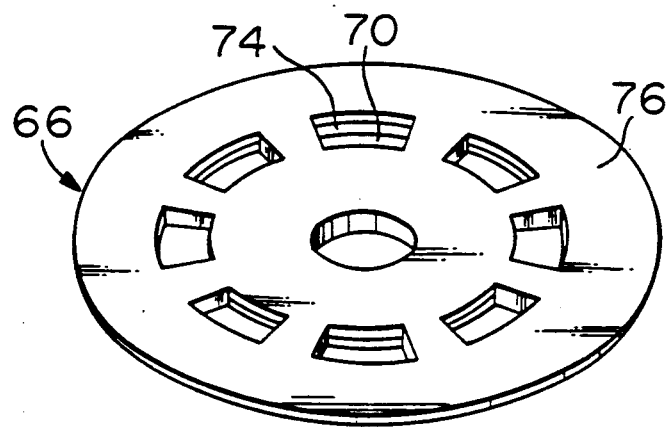
FIG. 11 is a perspective view of the metallic part of the hub according to the present invention.

In FIGS. 9 and 10, a reference numeral 64 designates a hub for a recording medium, which comprises a metallic part 66 and a resinous part 68. The metallic part 66 is a flat plate-like circular body in which bent portions 70 are formed at the intermediate portion between the inner periphery and the outer periphery by subjecting the plate-like body a stamping operation as shown in FIG. 11. As clearly shown in FIG. 10, each of the bent portions 70 has two openings 72 at radially opposing positions so as to be in parallel to the upper surface 76 or the lower surface 78 of the plate-like body, the openings 72 functioning to secure the resinous part 68 to the metallic part 66. It is preferable that the bent portions 70 are formed on the same axial center as the center of the metallic part at equal angular distances. In FIG. 11, there are shown eight bent portions. There causes no strain even though the stamping operation is conducted at the intermediate portion of the metallic part 66. The resinous material in the holes 72, 74 connects a resinous part 80 at the upper side of the bent portion 70 to a resinous part 82 at the lower side of the bent portion, whereby the resinous part 68 is firmly attached to the metallic part 66. When the surface area of the metallic part 66 is made large so that it extends to the outer circumferential portion of the hub 64, a magnetically attracting surface and a reference surface can be separately provided on the upper surface 76. Accordingly, when the magnetically attracting surface is provided near the outer circumferential portion, it is possible to obtain a large rotating force by a small attracting force. The magnetically attracting surface is referred to a surface to which a magnet of a driving unit is attracted and the reference surface is referred to a surface which provides a standard to determine the position of a disk to the driving unit.

FIGS. 12 to 15 show a separate embodiment of the present invention. In this embodiment each of the bent portions is divided into two parts by a shearing force by the stamping operation which avoids possible occurrence of a strain in the surface area of the metallic part. Namely, each of the bent portions 86 is formed at the outer circumferential portion of the metallic part 84 and a slit 90 is formed in the bent portion so as to extend from a hole in each of the bent portions 86 to the outer periphery. By providing the slit 90, an upper resinous portion 92 of the bent portion 86 and a lower resinous portion 94 is connected through the slit 90, whereby the resinous part 96 is firmly connected to the metallic part 84.

Figure 12:
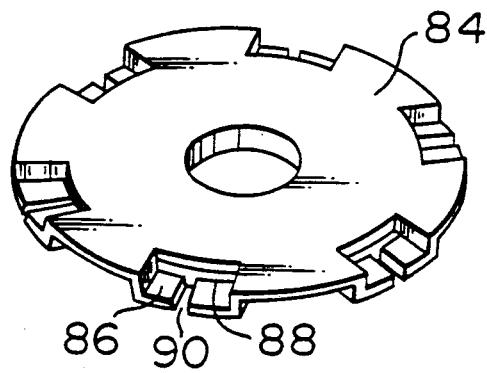
FIG. 12 is a perspective view of another embodiment of the hub according to the present invention.
Figure 13:
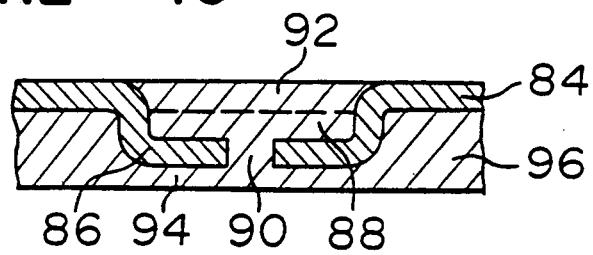
FIG. 13 is a cross-sectional view partly broken which corresponds to the view shown in FIG. 1B.
Figure 14:
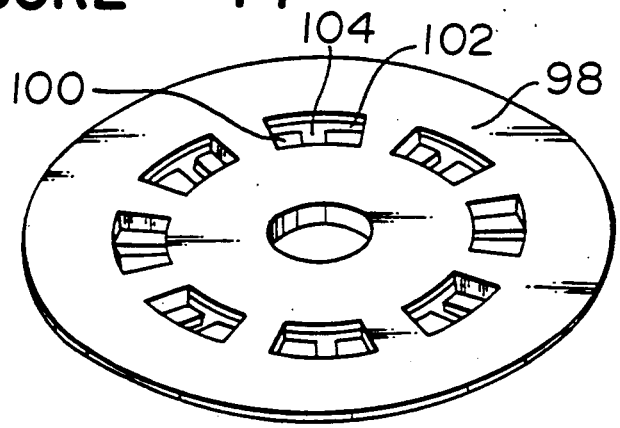
FIG. 14 is a perspective view of another embodiment of the metallic part of the hub according to the present invention.
Figure 15:
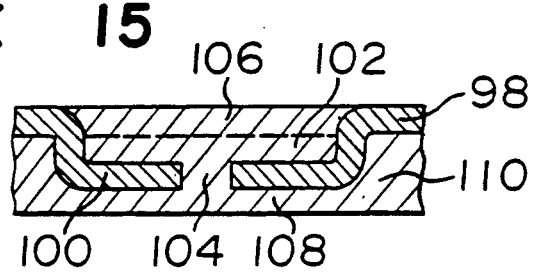
FIG. 15 is an enlarged cross-sectional view of the metallic part as shown in FIG. 14, which corresponds to the view as in FIG. 10B.
Figure 16:
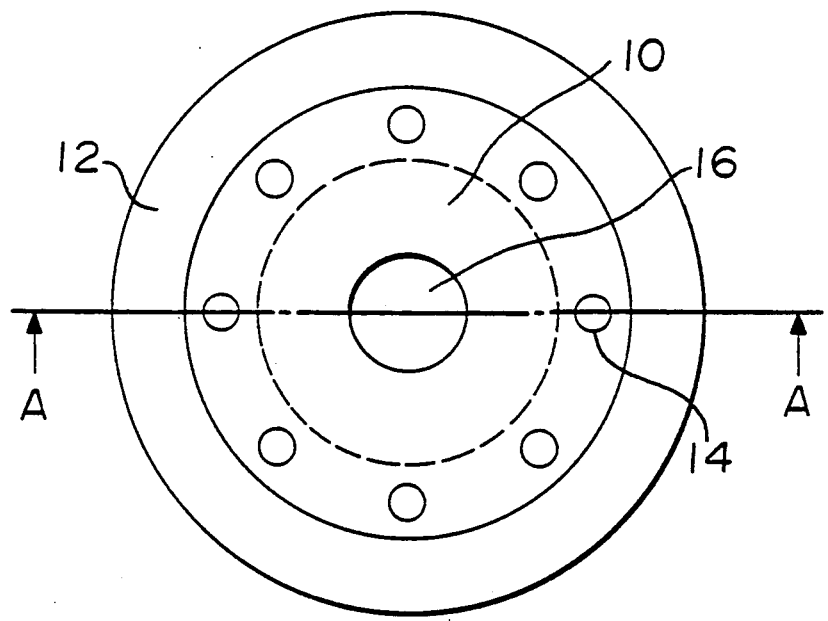
FIG. 16 is a plane view of a conventional hub used for an optical disk cartridge.
Figure 17:
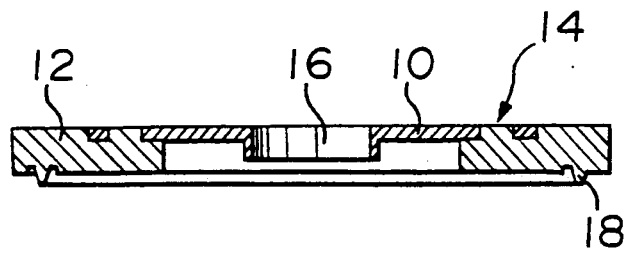
FIG. 17 is a cross-sectional view taken along a line A—A in FIG. 16.
Figure 18:
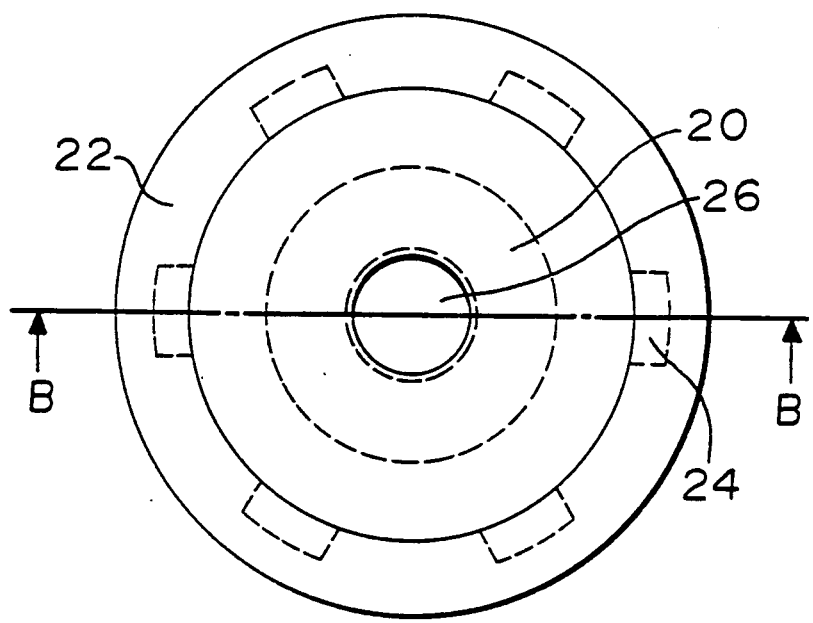
FIG. 18 is a plane view of another conventional hub used for an optical disk cartridge.
Figure 19:
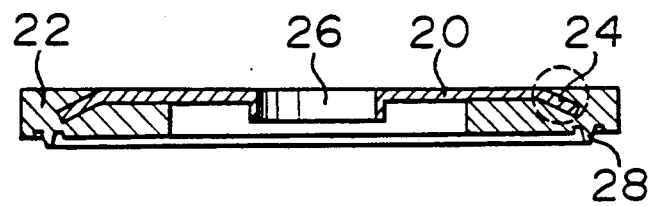
FIG. 19 is a cross-sectional view taken along a line B—B in FIG. 18.
Figure 20:
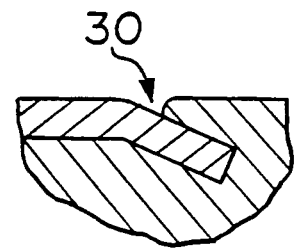
FIG. 20 is an enlarged view of a dotted circle line portion in FIG. 19.

FIGS. 14 and 15 show another embodiment of the hub according to the present invention. In FIGS. 14 and 15, a plurality of bent portions 100 are formed in the metallic part 98 at the intermediate portion of it, and a slit 104 is formed in each of the bent portions 100 so that it communicates one of the holes 102 with the other which oppose in the bent portion in the radial direction. In the same manner as the embodiment as shown in FIGS. 12 and 13, the slit 104 acts to connect an upper resinous portion 106 of the bent portion to a low resinous part 108.

Thus, in accordance with the hub of the present invention, a resinous part is firmly corrected to a metallic part; and a product having accurate dimensions can be manufactured at a low cost.

Obviously, numerous modifications and variations of the present invention are possible in light of the above teachings. It is therefore to be understood that within the scope of the appended claims, the invention may be practiced otherwise than as specifically described herein.

What is claimed is:

1. A hub to be attached to the central portion of a recording medium which comprises:

a flat plate-like body made of a metallic material and including upper and lower surfaces and at least one indentation having a depth sufficiently so large that the upper surface of the body at the intended area is positioned below the lower surface of the body at the non-intended areas to form an aperture between the lower surface of the flat plate-like body and an upper surface of the indentation, the aperture forming an open area having an outer peripheral edge positioned substantially transversely to at least one of the upper and lower surfaces of the flat plate-like body so that the open area of the aperture permits passage through the aperture in a radial direction of the flat plate-like body, and an annular resinous body firmly attached to said flat plate-like body by insertion-molding such that at least a portion of the annular resinous body extends through the apertures for connecting said annular resinous body to said flat plate-like body.

2. The hub according to claim 1, wherein said flat plate-like body has a circular form and a plurality of indentations with apertures are formed at an outer periphery of said circular plate-like body at equal angular distances.

3. The hub according to claim 1, wherein said flat plate-like body has a circular form and a plurality of indentations with apertures are formed on a coaxial circle line at an intermediate portion of said circular plate-like body at equal angular distances.

4. The hub according to claim 1, wherein said at least one indentation with the aperture is formed by a shearing force of a stamping operation.

5. The hub according to claim 1, wherein said aperture is formed at an inner radial side of the at least one indentation.

6. The hub according to claim 1, wherein said at least one indentation is divided into two sections.

* * * * *